(12) United States Patent
Grehant et al.

(10) Patent No.: US 7,701,160 B2
(45) Date of Patent: Apr. 20, 2010

(54) OPERATING METHOD FOR A POWERED ROLLER SHUTTER, AND DEVICE FOR IMPLEMENTING SAME

(75) Inventors: Bernard Grehant, Nancy-sur-Cluses (FR); Cyrille Froidure, Saint Cergues (FR); Valérie Maistre, Thyez (FR); Paul Violland, Marignier (FR)

(73) Assignee: Somfy SAS, Cluses (FR)

( * ) Notice: Subject to any disclaimer, the term of this patent is extended or adjusted under 35 U.S.C. 154(b) by 556 days.

(21) Appl. No.: 11/547,250

(22) PCT Filed: Apr. 8, 2005

(86) PCT No.: PCT/IB2005/000922

§ 371 (c)(1),
(2), (4) Date: Apr. 30, 2007

(87) PCT Pub. No.: WO2005/098191

PCT Pub. Date: Oct. 20, 2005

(65) Prior Publication Data

US 2007/0261802 A1    Nov. 15, 2007

(30) Foreign Application Priority Data

Apr. 9, 2004   (FR) .................................. 04 03739
Jun. 10, 2004  (FR) .................................. 04 06284

(51) Int. Cl.
    *H02P 1/00*    (2006.01)
(52) U.S. Cl. ........................ 318/445; 318/466; 318/280
(58) Field of Classification Search ................ 318/455, 318/466, 468, 280, 283
    See application file for complete search history.

(56) References Cited

U.S. PATENT DOCUMENTS

| 5,278,480 | A | * | 1/1994 | Murray ........................ 318/626 |
| 5,929,580 | A | * | 7/1999 | Mullet et al. ................. 318/466 |
| 5,969,637 | A | * | 10/1999 | Doppelt et al. ......... 340/825.69 |
| 6,078,159 | A | * | 6/2000 | Valente et al. ............... 318/468 |
| 6,867,565 | B2 | * | 3/2005 | Maistre et al. ............... 318/468 |

FOREIGN PATENT DOCUMENTS

| DE | 296 20 199 U1 | 10/1997 |
| DE | 196 54 387 A1 | 11/1997 |
| EP | 0 822 315 A2 | 2/1998 |
| FR | 2 654 299 A1 | 5/1991 |

* cited by examiner

*Primary Examiner*—Rina I Duda
(74) *Attorney, Agent, or Firm*—Frommer Lawrence & Haug LLP; Ronald R. Santucci

(57) ABSTRACT

The invention relates to an operating method for a roller shutter comprising an actuator which is used to move the shutter and which consists of: a motor, an electronic control unit for powering the motor, and a control box which is connected to the electronic unit and which is equipped with at least one control key. The inventive operating method comprises at least one configuration mode, during which values that are associated with specific positions can be recorded. The invention is designed such that a roller shutter movement command only occurs after a key has been pressed during a period of time greater than a first period t1 if the device is not at least partially configured, but the pressing of a control key can be immediately interpreted as a command to move the mobile element if the device is at least partially configured.

12 Claims, 2 Drawing Sheets

OPERATING METHOD FOR A POWERED ROLLER SHUTTER, AND DEVICE FOR IMPLEMENTING SAME

This is a 371 filing of international application number PCT/IB2005/000922 filed Apr. 8, 2005, published on Oct. 20, 2005 under publication number WO 2005/098191 A and claims priority benefits from French Patent Application No. FR 04 03739 filed Apr. 9, 2004 and French Patent Application No. FR 04 06284 filed Jun. 10, 2004.

FIELD OF INVENTION

The invention relates to a method of operating a closure, privacy or sun protection device according to the preamble of claim 1. The invention also relates to a device for implementing such a method.

BACKGROUND OF INVENTION

Actuators are used to operate, thanks to the mechanical energy supplied by their motor, mobile elements of the opening type, roller screens or sun protections. A user may control the movements of this element by pressures on control keys of a control module.

In the cases of very simple control modules comprising only two keys associated with the two directions of movement of the element, even comprising only one key to provide sequential control of the movements of the mobile element in both directions and stop, it is often necessary to provide a specific tool for configuring the actuator, by defining, for example, a top end-of-travel, a bottom end-of-travel, a preferred intermediate position and also for associating the various keys of the control module with a direction of rotation of the motor.

The configuration operations may be carried out on the one hand while the actuator is integrated into the element to be operated which is for example a roller shutter or a blind, and on the other hand after the actuator has been integrated into the element during installation on site. The configuration steps may be carried out manually or, for example for the entry of end-of-travel positions, automatically if the actuators have electronic means allowing same (for example by detection of stops).

New, subsequent configuration operations, called resetting operations, may take place during the life cycle of the device comprising the mobile element and the actuator. These operations may in particular take place during maintenance phases. These resetting operations are relatively rare in the life of the device, but they must however be envisaged. Resetting operations may take place for example just after the set-up, if the installer wishes to make modifications to the positions set.

There is a large number of possible procedures allowing the configuration of an actuator.

Utility model DE 296 20 199 U and application DE 196 54 387 inform of a method for entering times at which movement commands can be sent to a privacy device. In this method, a pressure on a control button for a particular duration is interpreted as a programming command.

Application EP 0 822 315, the contents of which are incorporated by reference in the present application, informs for example of a device for controlling the power supply of an asynchronous electric motor in which a short-circuiting of the phase lines allowing the rotation of the motor in a first direction and in a second direction by a simultaneous pressure on keys for controlling the rotation of the motor in the first direction and in the second direction places the control electronics in a configuration mode.

Patent FR 2 654 229, the contents of which are incorporated by reference in the present application, also informs of a motor control method. In this method, a simultaneous pressure for more than four seconds on the keys controlling the rotation of the motor in the two opposing directions is interpreted as a command to switch to configuration mode.

A further simultaneous pressure may be used to confirm an entry or to quit the configuration mode.

Similarly, the control electronics of an actuator may be directly placed in configuration mode when it is powered up for the first time. The control electronics may also be placed in configuration mode by a known operation called mains disconnection, that is to say that it reacts to a sequence calibrated in time comprising interruptions of the electricity supply.

In most cases, various modes of operating the actuator are thus defined (operating mode and configuration mode), in which similar actions on the control module are interpreted differently. In configuration mode, it is usually necessary to be able to move the mobile element, and therefore to have Up and Down controls, in order to adjust the positions to be entered for example, and to confirm the configuration steps. This poses a problem particularly when there are few keys and/or when the keys cannot be actuated simultaneously.

U.S. Pat. No. 6,078,159, the contents of which are incorporated by reference in the present application, informs of a device for operating a closure element. The device comprises a control module furnished with two keys used respectively for controlling the operation of the operating element in a first direction and in a second direction. To place this device in a configuration mode, it is necessary to actuate at least twice one or other of the keys, each in a predefined time frame and shorter than the duration of actuation used to control the movement of the closure element. No movement command is recognized during this predefined time frame. Thus, when there is a desire to control the movement of the closure element, the control key has to be actuated for a duration greater than that of the predefined time frame.

The latter solution provides an alternative to the procedures provided in the prior art and in particular in application EP 0 822 315 and patent FR 2 654 229. On the other hand, a delay to the start of the actuator must be introduced to allow the interpretation of the duration of pressure on a control key. These delays to the starting of the motor may be annoying in use. Specifically, it is usual to obtain an immediate response from the controlled device following an action carried out on a control module.

The aim of the invention is to supply a method of operating a closure, privacy or sun protection device improving the known methods of the prior art and alleviating the aforementioned disadvantages. In particular, the invention proposes a method of operating a device in which the control commands, entered by means of a control module, are executed immediately by the device and in which the initial and subsequent configuration operations may be carried out with the very simply constructed control module comprising for example only two control keys.

SUMMARY OF INVENTION

The method according to an embodiment of the invention is characterized by a method of operating a closure, privacy or sun protection device. The method includes an actuator for moving a closure, privacy or sun protection mobile element, where the actuator has a motor, an electronic unit for controlling the power supply of the motor, and a control module connected to the electronic unit. The control module is furnished with at least one control key. The operating method includes at least a first mode called configuration mode during which one or more values associated with particular positions can be entered to configure the device. If the device is not at least partially configured, a command to move the mobile element is produced only after a pressure on the at least one control key for a duration greater than a first duration t1. If the device is at least partially configured, then a pressure on the at least one control key is interpreted immediately as a command to control movement of the mobile element.

Different embodiment variants of the method described above are herein defined.

The device according to the invention comprises an actuator for moving a closure, privacy or sun protection mobile element, the actuator comprising a motor, an electronic unit for controlling the power supply of the motor furnished with a memory and a control module connected to the electronic unit and furnished with at least one control key. It is noteworthy in that it comprises means of electronically and/or mechanically managing pressures on the key or keys of the control module allowing the implementation of the aforementioned method.

The device may comprise a configuration indicator to indicate whether one or more values associated with particular positions of the mobile element have been entered.

BRIEF DESCRIPTION OF DRAWINGS

The appended drawing represents, as an example, a control method according to the invention and a device for its application.

DETAILED DESCRIPTION OF THE INVENTION

Figure 1:
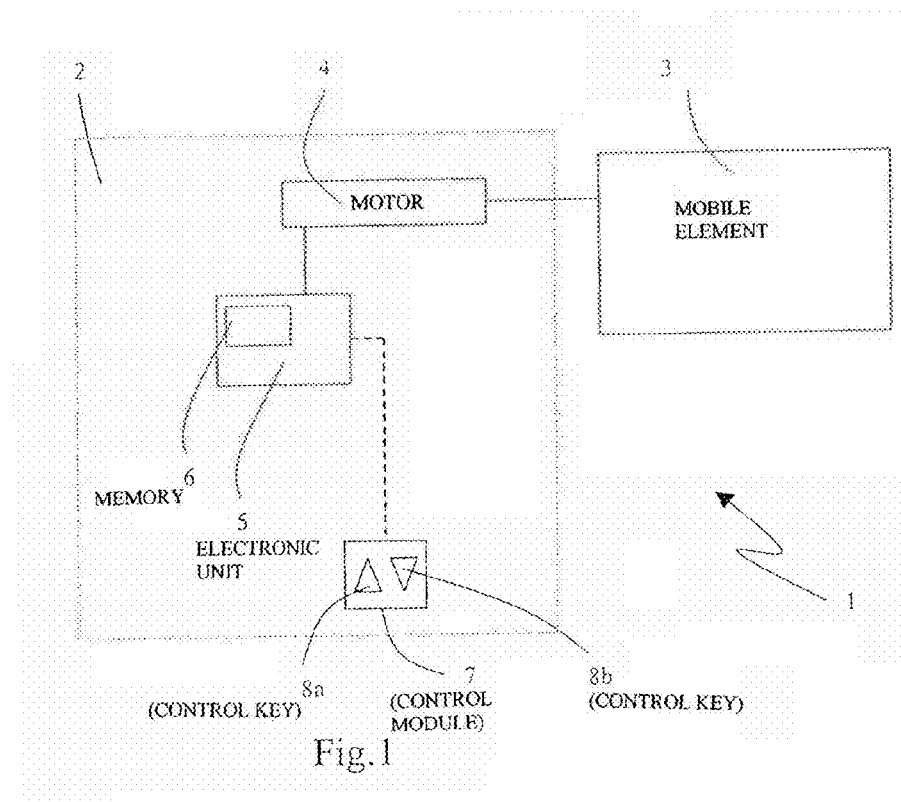
FIG. 1 is a diagram of a device for applying the method according to the invention.

A motorized closure, privacy or sun protection device 1 is represented in FIG. 1. The device comprises an actuator 2 capable of causing the movement of a mobile element 3 such as a blind, a shutter or a screen. The actuator comprises a gear motor 4 connected to an electronic control unit 5. This electronic control unit comprises or is connected to a memory 6. Its function is in particular to control the rotation of the gear motor and to determine the position in which the mobile element is at all times. The actuator may for this purpose comprise a counting device associated with a sensor for example of the Hall effect or optoelectronic type.

To control the actuator 2, and consequently the mobile element 3, the user has an interface in the form of a control module 7 furnished with control keys 8a and 8b. These keys 8a and 8b are used respectively to control the upward and downward movement of the mobile element. The control module may be integrated into the actuator or placed at a distance therefrom. When it is placed at a distance, the control module 7 may communicate with the electronic control unit 5 thanks to a wire link or thanks to an electromagnetic wave link (for example radio waves or infra-red waves). In these cases, the control module 7 and the electronic control unit 5 respectively comprise a signal transmitter and receiver.

A pressure on one of the keys causes the transmission of a control command from the control module 7 to the electronic control unit 5, which causes the gear motor 4 to rotate in the direction corresponding to the command and therefore the movement of the mobile element 3.

Figure 2:
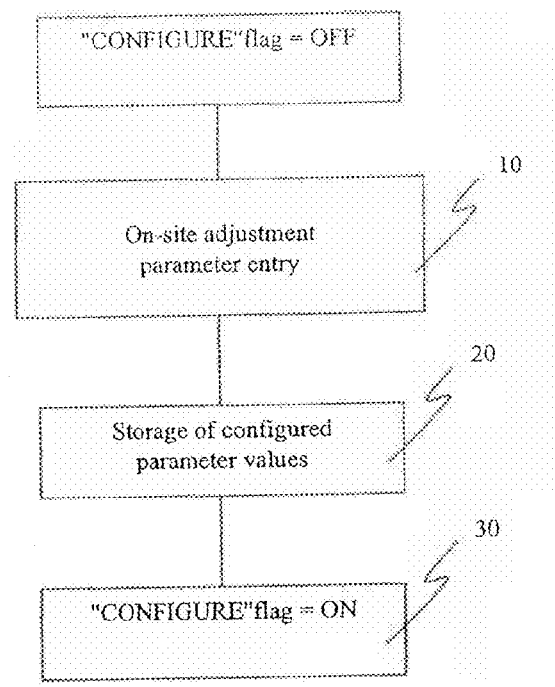
FIGS. 2 and 3 are instruction flowcharts detailing one embodiment of the operating method according to the invention.

Initial operations for configuration of a closure, privacy or sun protection device are described hereinafter with reference to the instruction flowchart of FIG. 2.

In a first phase 10, initial configuration operations are carried out. A pairing between the control module 7 and the electronic control unit is carried out where necessary, then movements of the mobile element are commanded to bring the latter into particular positions to be entered. While no entry of a particular position has been made, the memories 6 linked to the electronic control unit are blank. In this phase, any movement control is executed only when the action of the installer on the corresponding key of the control module is maintained for longer than a predetermined duration t1, where for example t1=0.5 second.

In a second phase 20, values corresponding to particular positions of the mobile element are entered into memory.

In a third phase 30, when information is given to at least one memory associated with a particular position of the mobile element (for example an end-of-travel position, intermediate predefined position), and, preferably, when the two end-of-travel positions are entered, a configuration indicator "CONFIGURE" is activated. The electronic control unit may also have for example an indicator with two states which switches over when one of the memories associated with the entry of a position is no longer blank.

Alternatively, the configuration indicator "CONFIGURE" may be activated when a particular position is determined during an automatic procedure, for example by detecting a stop.

An action of erasing all the data contained in the memories 6 (RESET action known in the prior art) deactivates the configuration indicator "CONFIGURE".

Figure 3:
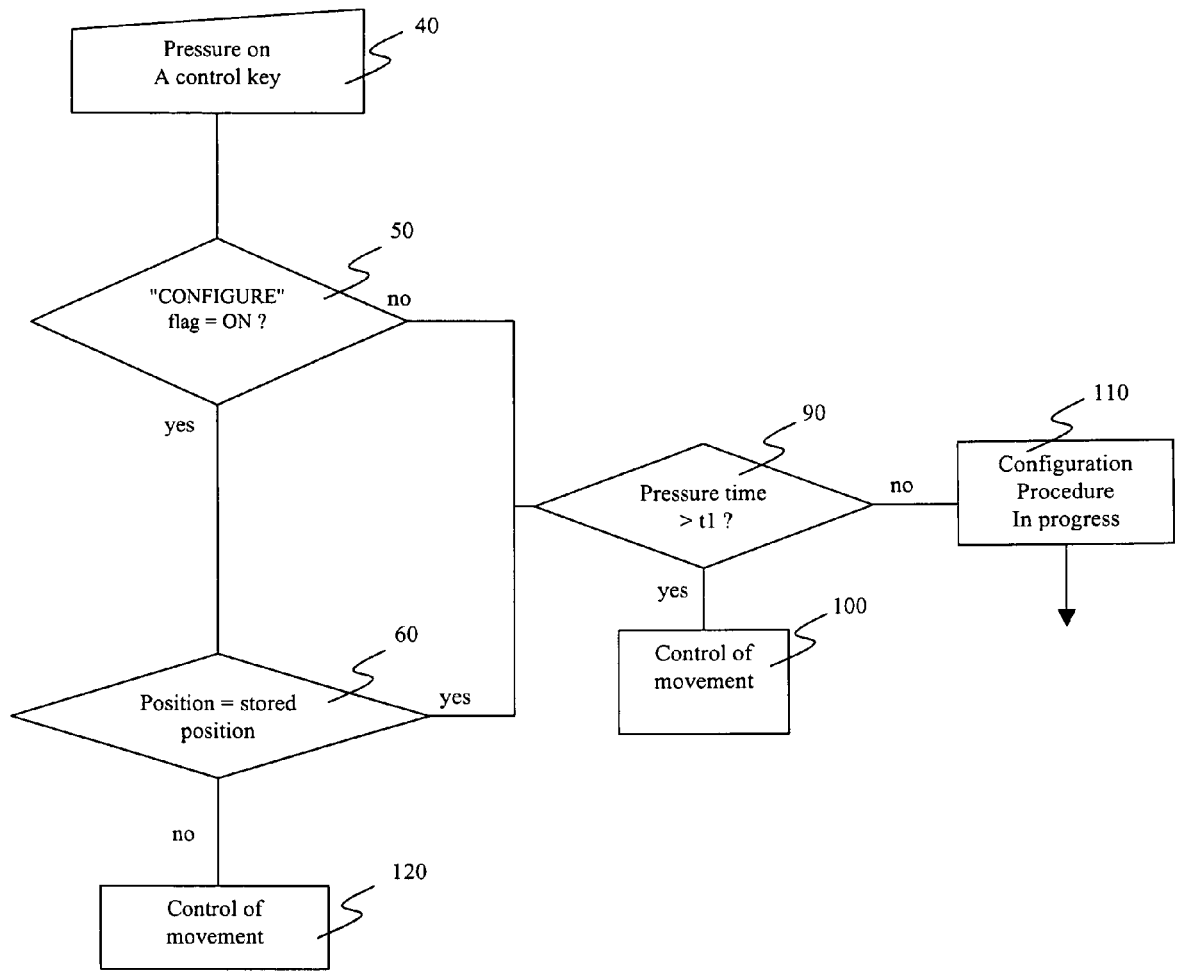

One embodiment of the control method according to the invention is described hereinafter with reference to the instruction flowchart of FIG. 3.

In a step 40, a pressure is exerted on a key of the control module 7, a control command signal is transmitted to the electronic control unit 5, this signal containing a certain quantity of information allowing it to determine in particular the content of the command, its origin and the duration of the pressure.

In a step 50, the state of the configuration indicator "CONFIGURE" is tested. If the indicator is deactivated, in a step 90, the duration of the pressure on the key of the control module is tested. If this duration is greater than the predetermined duration t1, the pressure of step 40 is considered, in a step 100, as being intended to cause the movement of the mobile element and the actuator 4 is consequently powered. If the duration is shorter than the predetermined duration t1, the pressure is considered, in a step 110, as a particular pressure, forming part of a configuration procedure and no movement of the mobile element 3 is commanded. During this step 110, the particular pressure may be considered for example to be a command to change operating mode of the motorized closure, privacy or sun protection device, to be a command to confirm an adjustment, to be a command to initiate a period of disablement of the electronic unit or to be an operation forming part of a set-up procedure.

If, during the test step 50, it is noted that the configuration indicator "CONFIGURE" is activated, the position that the mobile element 3 occupies is tested during a step 60. If the mobile element is not in a particular position such as the top end-of-travel position, the bottom end-of-travel position or a predefined intermediate position, the pressure of step 40 is considered, in a step 120, as being intended to cause the movement of the mobile element and the actuator 4 is consequently powered without the least delay perceptible by the user.

It goes without saying that certain time delays, due in particular to the electronics, will be involved in a movement command; thus the start-up time of the electronics, the time for charging the capacitors, the analysis of the control command (for example by filtering), will increase the reaction time between the pressure and the actual movement of the actuator. The terms used in the present application, in particular "without the least delay perceptible by the user", "immediately" may take these time delays into account.

If, during step 60, it is noted that the position occupied by the mobile element 3 corresponds to one of the end-of-travel positions or to a predefined intermediate position, there is a return to the test step 90.

Thus, if the configuration indicator is active, that is to say if the device is partially or is, preferably, fully configured, the pressures on the control keys of the control module will give rise immediately to a movement of the mobile element, unless the latter is in a particular position and in this case the pressure will have to be maintained for a duration greater than the predetermined duration t1 so that the latter is interpreted as a movement command. A pressure of a duration shorter than the predetermined duration t1 will be considered to be a signal to switch to the device configuration mode.

Provision may be made for this operation causing a delay in the movement control to concern only one key, for example, the key 8a (controlling the movement to raise the mobile element upward) when the mobile element is in the top end-of-travel position and the key 8b (controlling the movement to lower the mobile element downward) when the mobile element is in the bottom end-of-travel position.

In this case, the user wishing to generate a pressure to switch to configuration mode must release his pressure or cancel the command (in the case of one key such that the transmission of the signal is retained mechanically or electronically) in a time less than a duration t1.

If the mobile element, on the other hand, is in any position, any command immediately takes effect. A test of the duration of pressure may however be used in this case, but the duration concerned is then usually imperceptible to the user. Most frequently it is a test of the order of 10 ms approximately, used for example to avoid electrical interference. The controlled movement will, as has been mentioned above, be delayed by a time resulting from mechanical and electronic time delays necessary to start the actuator.

If the configuration indicator is inactive, and irrespective of the position of the mobile element, a test is carried out on the duration of the pressure. The startup of the motor is therefore necessarily delayed by the predetermined duration t1.

The operating method according to the invention has the advantage of making it possible to retain the same procedure to carry out the initial and subsequent configuration operations which simplifies the task of the installer.

Alternatively, when at least one particular position of the mobile element has been entered, another procedure may be used in this or these particular positions.

When the device has been installed on the site and configured by the installer, the user is no longer subject to motor startup delays which may be annoying in use.

The position of the mobile element may also be identified by a duration, for example a duration of movement relative to a reference position. The position counting is then activated by a clock.

The operating method is adapted to the procedures making it possible to place the control electronics in a configuration mode by analyzing the duration of the control pressures, irrespective of the number of keys of the control module and irrespective of the link (wire or wireless) between the control module and the electronic control unit of the actuator.

To implement the operating method according to the invention, it is possible for example to store in the memory 6 of the electronic unit 5 a value representing the duration making it possible to distinguish between the long pressures and the short pressures on the control keys. This value may then change as a function in particular of the operating mode of the device and the position of the mobile element. Thus this value will for example be substantially zero when the closure, privacy or sun protection device is in the control mode and when the mobile element is not in a particular position. In these conditions, any pressure on one of the control keys is considered to be a long pressure generating a command to control movement of the mobile element.

We claim:

1. A method of operating a closure, privacy or sun protection device, comprising an actuator for moving a closure, privacy or sun protection mobile element, the actuator comprising a motor, an electronic unit for controlling the power supply of the motor and a control module connected to the electronic unit, wherein the control module is furnished with at least one control key, able to perform a command to control movement of the mobile element, the operating method comprising:
   at least a first mode called configuration mode during which one or more values associated with particular positions can be entered to configure the device, to enter in this first mode, the control key should be at least pressed and wherein
   if the device is not at least partially configured, a pressure on the control key is interpreted as a movement command to control the mobile element only if it lasts longer than a first duration t1, and
   if the device is at least partially configured, then a pressure on the control key is interpreted immediately as a command to control movement of the mobile element.

2. The operating method as claimed in claim 1, wherein a pressure on a control key can be interpreted immediately as a command to control movement of the mobile element if the device is completely configured.

3. The operating method as claimed in claim 1, wherein a pressure for a duration less than the first duration t1 on the control key is interpreted immediately as a command to control movement of the mobile element if the device is in a second mode called control mode and if the mobile element is not in a particular position, and wherein a pressure for a duration less than the first duration t1 on this control key is interpreted differently from a command to control movement of the mobile element in at least one of the following cases: the device is in the configuration mode, the device is in the control mode while the mobile element is in a particular position.

4. The operating method as claimed in claim 1, wherein a pressure for a duration less than the first duration t1 on the control key is interpreted immediately as a command to control movement of the mobile element if the device is in a second mode called control mode and if, when the mobile element is in a particular end-of-travel position, the actuated control key is a key for controlling movement of the mobile element to another end-of-travel position, and wherein a pressure for a duration less than the first duration t1 on this control key is interpreted differently from a command to control movement of the mobile element in at least one of the following cases: the device is in the configuration mode, the device is in the control mode and the actuated control key is a key for controlling movement of the mobile element to an end-of-travel position while the mobile element is in this end-of-travel position.

5. The operating method as claimed in claim 1, wherein the closure, privacy or sun protection device switches automatically from the configuration mode to the control mode when one or more values corresponding to particular positions of the mobile element have been entered in a memory of the actuator.

6. The operating method as claimed in claim 1, wherein the closure, privacy or sun protection device switches automatically from the control mode to the configuration mode when at least one value corresponding to a particular position of the mobile element has been erased from a memory of the actuator.

7. The operating method as claimed in claim 1, wherein a particular position of the mobile element is an end-of-travel position or an intermediate position determined manually or automatically.

8. The operating method as claimed in claim 1, wherein one or more pressures for a duration less than the first duration t1 on one of the control keys while the closure, privacy or sun protection device is in the control mode and interpreted differently from commands to control movement, cause the closure, privacy or sun protection device to switch over to the configuration mode.

9. The operating method as claimed in claim 1, wherein a pressure for a duration less than the first duration t1 on the control key while the closure, privacy or sun protection device is in the control mode and interpreted differently from a command to control movement, causes the electronic unit to switch over to a disable state in which at least one further pressure on the control key is analyzed but does not give rise to a control of movement of the mobile element, a particular sequence of pressures in the disable state allowing the configuration of the actuator.

10. A closure, privacy or sun protection device, comprising an actuator for moving a closure, privacy or sun protection mobile element, the actuator comprising a motor, an electronic unit for controlling the power supply of the motor furnished with a memory (6) and a control module connected to the electronic unit and furnished with at least one control key, wherein the device comprises means of electronically and/or mechanically managing pressures on the control key or keys of the control module allowing the implementation of the method as claimed in claim 1.

11. The closure, privacy or sun protection device, as claimed in claim 10, wherein the device comprises a configuration indicator (CONFIGURE) to indicate whether one or more values associated with particular positions of the mobile element have been entered.

12. A method of operating a closure, privacy or sun protection device, comprising an actuator for moving a closure, privacy or sun protection mobile element, the actuator comprising a motor, an electronic unit for controlling the power supply of the motor and a control module connected to the electronic unit, wherein the control module is furnished with a control key, able to perform a command to control movement of the mobile element, the operating method comprising:
 at least a first mode called configuration mode during which one or more values associated with particular positions can be entered to configure the device, wherein said control key is at least pressed to enter in this first mode, and wherein,
 if the device is not at least partially configured, a pressure on the control key is interpreted as a movement command to control the mobile element only if it lasts longer than a first duration t1, and
 if the device is at least partially configured, then a pressure on said control key is interpreted immediately as a command to control movement of the mobile element.

* * * * *